United States Patent
Hein et al.

(10) Patent No.: US 6,231,407 B1
(45) Date of Patent: *May 15, 2001

(54) SHIP PROPULSION WITH A GONDOLA-LIKE SYNCHRONOUS MOTOR

(75) Inventors: Peter Hein; Christian Meyer, both of Berlin (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,862
(22) PCT Filed: Jun. 18, 1997
(86) PCT No.: PCT/DE97/01292
 § 371 Date: Sep. 22, 1999
 § 102(e) Date: Sep. 22, 1999
(87) PCT Pub. No.: WO97/49605
 PCT Pub. Date: Dec. 31, 1997

(30) Foreign Application Priority Data

Jun. 26, 1996 (DE) .............................. 196 27 323

(51) Int. Cl.$^7$ .................................................. B60L 11/00
(52) U.S. Cl. ................................................................ 440/6
(58) Field of Search .................. 440/6; 310/87

(56) References Cited

U.S. PATENT DOCUMENTS

| | | |
|---|---|---|
| 2,714,866 | 8/1955 | Pleuger et al. . |
| 4,297,784 | * 11/1981 | Vagman ................................. 29/596 |
| 4,908,538 | * 3/1990 | Geberth, Jr. ............................ 310/59 |
| 5,101,128 | * 3/1992 | Veronesi et al. ......................... 440/6 |
| 5,403,216 | 4/1995 | Salmi et al. . |
| 5,667,362 | * 9/1997 | Murai et al. ............................ 417/41 |

FOREIGN PATENT DOCUMENTS

| | | |
|---|---|---|
| 917 475 | 9/1954 | (DE) . |
| 36 32 645 | 3/1988 | (DE) . |
| 42 13 132 | 11/1992 | (DE) . |
| 0 523 353 | 1/1993 | (EP) . |
| 0 548 733 | 6/1993 | (EP) . |
| 63-140643 | 6/1988 | (JP) . |
| 8 802 686 | 6/1990 | (NL) . |

OTHER PUBLICATIONS

H. Bönning et al., "Der MEP–Motor, ein permanenterregter Fahrmotor für den Schiffsbetrieb," 1988, pp. 229–234.

K. Magens, "Permasyn—Ein permanenterregter Synchronmotor für den schiffsbetrieb," 1988, pp. 221–227.

H. Weh, "Die Transversalflussmaschine," 1992, pp. 68–73.

J. Heinemann, "Elektrischer Motorpropeller—Stand der Entwicklung und Anwendung," 1992, pp. 88–94.

DiBenito Bragone, "Il piú grande motore a magneti permanenti per propulsione navale", Technologie& Transporti Mare, Feb. 1996, pp. 30–31. (English abstract provided).

"Manoeuvrability –A Unique Electric Thrust Unit", Marine Propulsion, Sep./Oct/ 1989, p.24.

Mikko Niini, "A new generation of 'standard' diesel–electric RoRo ferry",RoRo94, Session 10, Gothenburg (Apr. 27, 1994).

* cited by examiner

*Primary Examiner*—Sherman Basinger
(74) *Attorney, Agent, or Firm*—Kenyon & Kenyon

(57) ABSTRACT

To improve the propulsion efficiency of a ship propulsion having a housing to be arranged on the bottom of the hull in a gondola-like manner, with a synchronous motor in the housing, at propulsion powers of approximately 10 MW, the rotor of the synchronous motor is designed as a permanent-magnet rotor, and the stator of the synchronous motor is fitted into the housing in a form-fitting manner to be cooled through the housing wall. An additional cooling device in the form of a fan or a spray device may be provided for each winding overhang.

5 Claims, 1 Drawing Sheet

SHIP PROPULSION WITH A GONDOLA-LIKE SYNCHRONOUS MOTOR

FIELD OF THE INVENTION

The present invention relates to ship propulsion and may be applied in the design of a synchronous motor which is located in a hydrodynamically designed part of a housing arranged on the bottom of the ship's hull for the purpose of directly driving a propeller.

BACKGROUND INFORMATION

In conventional ship propulsion, described in U.S. Pat. No. 2,714,866, a motor is provided which is a three-phase alternating current motor with a squirrel-cage rotor, with the rotor sitting on a hollow shaft which is in turn linked to the drive shaft running inside the hollow shaft by a coupling. The drive shaft is coupled directly to the propeller. In this ship propulsion system, the stator of the motor is surrounded by a tubular housing which is in turn inserted into a pipe hanger-type housing part mounted gondola fashion on the bottom of the hull. The motor including the rotor bearings is cooled with fresh water pumped from a tank arranged in the hull into the interior of the motor housing and circulated throughout. (see, e.g., U.S. Pat. No. 2,714,866).

German Patent No. 917 475 describes a ship propulsion of a silimilar design, the stator of the three-phase motor is fitted into the hydrodynamically designed housing part in a form-fitting manner to cool it by water flowing past this housing part. The interior of the housing part accommodating the three-phase motor is filled with water under pressure. This water is provided for bearing lubrication and heat transfer.

In another convention ship propulsion described in U.S. Pat. No. 5,403,216 and a publication "A New Generation of Standard Diesel Electic RoRo Ferry" by Kvaerner Masa Yard, which may be designed for a drive power of 10 MW or more, the dynamoelectric motor is supported with its stator on radially arranged web plates in the surrounding housing; the web plates used in this manner serve at the same time to form cooling channels for a gaseous coolant supplied from the marine hull. A synchronous motor with a squirrel-cage rotor is usually used as the motor, with the rotor optionally cooled by its arrangement on the hollow drive shaft through which water flows. With such a propulsion device, the ratio between the maximum diameter of the drive housing and the propeller diameter are selected so that the ratio between the two is less than 0.65, preferably in the range between 0.4 and 0.5. It should be recalled here that the propeller diameter cannot be selected of any desired size. The above-mentioned ratio of outside diameters influences the propulsion efficiency, which is inversely proportional to, the above-mentioned diameter ratio.

To cool an electric motor operated underwater, it is also known that insulation oil used as coolant can be pumped in circulation so that it releases heat to the surrounding water in cooling channels running axially in the area of the housing wall (U.S. Pat. No. 2,862,122 A). It is also known that high power (1 to 2 MW) three-phase motors set up outdoors can be cooled by passing a stream of air produced by a fan along the wall of the housing (German journal Siemens-Z. 1966, no. 40, page 13 ff.).

SUMMARY

An object of the present invention is to provide a system propulsion system with a drive power in the MW range while guaranteeing a favorable propulsion efficiency.

This object is achieved according to the present invention by the fact that three-phase motor is a synchronous motor and has a drive power of at least 2 MW, the rotor of the synchronous motor is a permanent-magnet rotor, and the interior of the housing parts accommodating the synchronous motor is free of flowing coolant.

With such a design of the propulsion device, no additional cooling measures need to be taken to cool the drive motor because of the use of a synchronous motor with a permanent-magnet rotor that produces practically no heat losses due to current. In addition, since a permanent-magnet rotor is smaller radially than a squirrel-cage rotor, the radial space required by the drive motor is reduced. This leads to a more advantageous ratio between the outside diameter of the drive housing and the outside diameter of the propeller, so that the propulsion system has an excellent propulsion efficiency for a ship propulsion of this magnitude. In particular, when taking the measures according to the present invention, it is possible to design ship propulsions where the ratio of the outside diameter of the hydrodynamically designed housing part to the outside diameter of the propeller is less than or at most equal to 0.4.

Permanent-magnet rotors may be used instead of squirrel cage rotors or rotors separately energized via collector rings with synchronous motors, in particular for electric machines with drive powers up to about 30 kW (see, e.g., Siemens-Z. 1975, no. 49, pp. 368–374). Such motors with drive powers of about 2 to 5 MW have already been designed for submarine propeller drives, with the axially very short motor, which is thus relatively large with respect to its outside diameter, being arranged inside the hull. With this motor the pole shoes of the rotor are composed of several permanent magnets made of a special samarium-cobalt alloy and are glued to the pole shaft. The stator core assembly of this motor is surrounded by two cooling rings through which fresh water flows. The fresh water is recooled by seawater in heat exchangers (see, e.g., brochure PERMASYN-Motoren für U-Boot-Propellerantriebe by Siemens A G, order No. E 10 001-A930-A29, and "Yearbook of the Shipbuilding Society", 1987, pp. 221–227).

If a ship propulsion designed according to the present invention is used in the upper power range (more than 5 to 10 MW), effective cooling of the winding overhang is important. It may then be expedient to provide an additional cooling device for each winding overhang of the stator. These additional cooling devices may be arranged in the interior space, which is present anyway due to the motor design, without any particular additional expense. Either fans arranged on the rotor shaft inside the winding overhang or a ring with a tubular cross section for each winding head at the end, this ring being provided with spray holes and its interior being connected by a pump to an insulating oil sump below the rotor shaft, may be used as cooling devices. In both variants, heat is removed from the coolant, whether air or insulating oil, in the same way as heat is removed from the stator via the surrounding motor housing wall.

DETAILED DESCRIPTION

Figure 1:
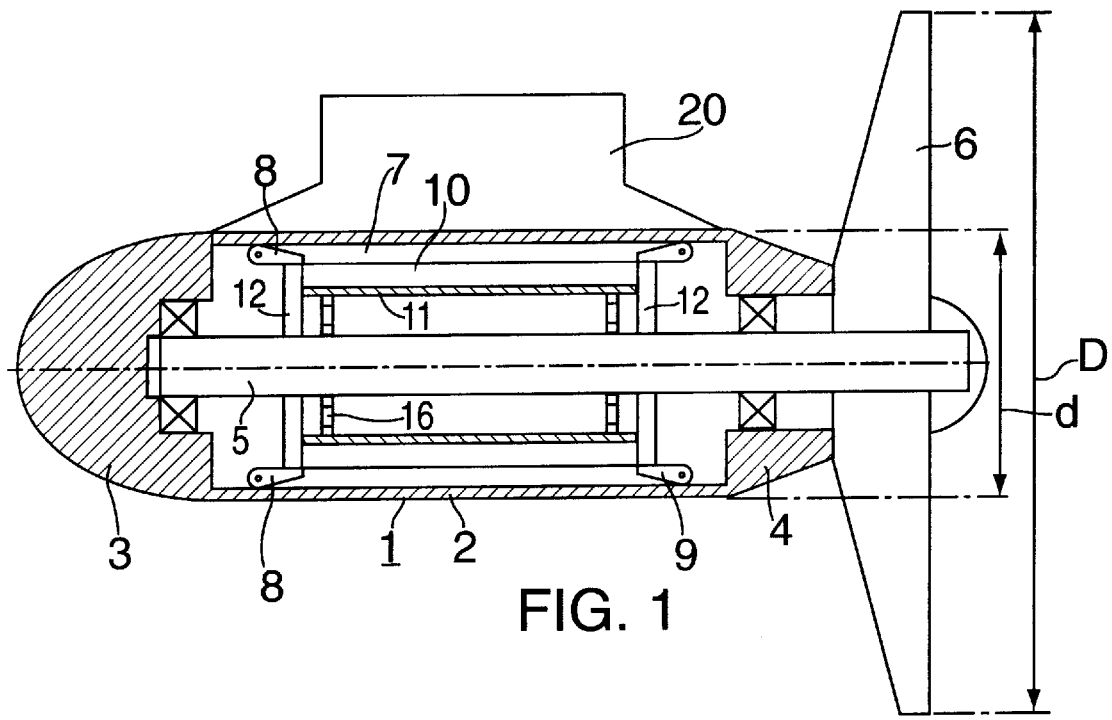
FIG. 1 illustrates a longitudinal section of a propulsion device with air cooling of the winding overhangs of the stator according to an embodiment of the present invention.

The propulsion device according to FIG. 1 has a hydrodynamically designed housing part 1 in the form of a gondola with a synchronous motor arranged in it, the synchronous motor having a stator 7 and a rotor 10, and a shaft 20, with the help of which the propulsion device may be mounted on the bottom of a hull in the manner of a gondola. Housing part 1 has hollow cylindrical part 2 and end caps 3 and 4, which carry the bearings of drive shaft 5. Propeller 6 is arranged on one end of the drive shaft 5.

Stator 7 of the synchronous motor is fitted in a form-fitting manner into the hollow cylindrical part 2, with this part of housing 1 being shrunk-fit onto the stator core assembly, for example. The windings of the stator are visible in winding overhangs 8 and 9. Rotor 10 of the synchronous motor is designed in a conventional manner as a permanent-magnet rotor, resting on drive shaft 5 with a supporting structure 11. Supporting structure 11 has axial passages 16.

A fan 12 is provided on drive shaft 5 inside each winding overhang 8 and 9. With the help of this fan, air in the interior of the synchronous motor is stirred up and flows past winding overhangs 8 and 9. The synchronous motor as a whole is cooled essentially through hollow cylindrical part 2 of housing 1, releasing heat to the water flowing past it with the movement of the ship.

Figure 2:
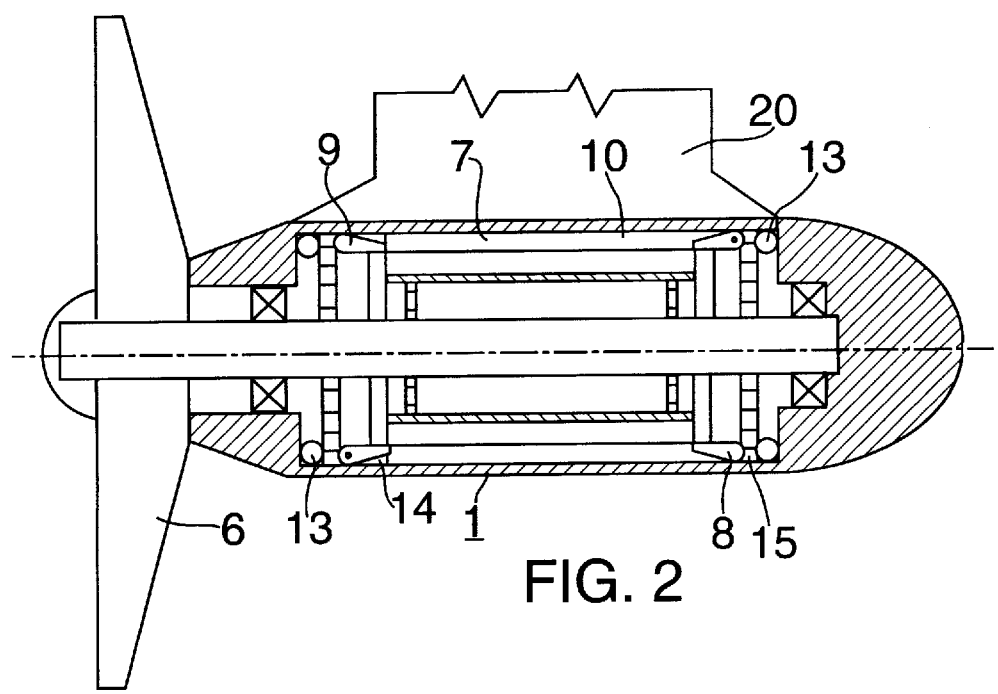
FIG. 2 illustrates a longitudinal section of a propulsion device with spray cooling of the winding overhangs according to an embodiment of the present invention.

In the embodiment according to FIG. 2, a ring 13 with a tubular cross section is arranged on each end of the winding overhangs 8 and 9 to cool these winding overhangs and is provided with spray orifices 15 in the direction of the winding overhangs. Insulating oil in sump 14 below drive shaft 5 may be sprayed through these spray orifices, being pumped from the sump into ring 13 by a pump located outside housing part 1. Heat is also removed from insulating oil sump 14 through housing part 1, as is also from the air stirred up according to FIG. 1. Sump 14 should not include the air gap of the motor. Spray rings 13 may be provided in addition to or as an alternative to fans 12.

Due to the fact that the synchronous generator with its stator is inserted in a form-fitting manner into hydrodynamically designed housing part 1, and permanent-magnet rotor 10 takes up less space radially than would a squirrel-cage rotor, housing part 1 may have a relatively small outside diameter d, so the ratio of outside diameter d of housing part 1 to outside diameter D of propeller 6 achieves a relatively small value of 0.35, for example, even if the synchronous motor is designed for a drive power of 2 to 20 MW or more.

This design of the new propulsion device does not depend on whether the gondola is mounted rigidly or rotatably on the hull. Thus, it is also suitable for bulkhead drives.

What is claimed is:

1. An electric propulsion device for a ship, comprising:

a gondola type housing mounted on a bottom of a hull of the ship, the gondola type housing having a hydrodynamically designed housing part, the hydrodynamically designed housing part having an interior free of a streaming coolant coming from outside of the hydrodynamically designed housing part; and a three-phase synchronous motor accommodated in the hydrodynamically designed housing part, the three-phase synchronous motor having a propulsion power of at least 2 MW, a permanent-magnet rotor, a rotor shaft attached to at least one propeller, and a stator, the stator being fitted into the hydrodynamically designed housing part in a form-fitting manner and being cooled by water flowing past the hydrodynamically designed housing part, an outside diameter of the hydrodynamically designed housing part being at most 40% of an outside diameter of the at least one propeller.

2. The electric propulsion device according to claim 1, further comprising winding overhangs associated with the stator and an additional cooling device for each winding overhang.

3. The electric propulsion device according to claim 2, wherein the additional cooling device includes a fan arranged on the rotor shaft inside each respective winding overhang for stirring up air in the interior of the synchronous motor.

4. The electric propulsion device according to claim 2, further comprising:

a ring having spray holes on an end for each winding overhang of the stator, an interior of the ring being coupled by a pump to an insulation oil sump below the rotor shaft for spraying oil onto the winding overhangs.

5. The electric propulsion device according to claim 1, wherein the hydrodynamically designed housing part includes a hollow cylindrical part, the hollow cylindrical part being shrunk-fit onto a stator core assembly.

* * * * *